(12) United States Patent
Nishina (10) Patent No.: US 8,832,192 B2
(45) Date of Patent: Sep. 9, 2014

(54) INFORMATION PROCESSING SYSTEM, INFORMATION PROCESSING METHOD, INFORMATION PROCESSING DEVICE, INFORMATION PROCESSING DEVICE CONTROL METHOD, INFORMATION PROCESSING TERMINAL, INFORMATION PROCESSING TERMINAL CONTROL METHOD, INFORMATION STORAGE MEDIUM AND PROGRAM

(75) Inventor: Eiichi Nishina, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 304 days.

(21) Appl. No.: 13/394,564

(22) PCT Filed: Sep. 6, 2010

(86) PCT No.: PCT/JP2010/065240
§ 371 (c)(1),
(2), (4) Date: May 23, 2012

(87) PCT Pub. No.: WO2011/030733
PCT Pub. Date: Mar. 17, 2011

(65) Prior Publication Data
US 2012/0233255 A1 Sep. 13, 2012

(30) Foreign Application Priority Data

Sep. 10, 2009 (JP) .................................. 2009-209494

(51) Int. Cl.
*G06F 15/16* (2006.01)
*G06Q 50/00* (2012.01)
*H04L 29/08* (2006.01)
*A63F 13/12* (2006.01)

(52) U.S. Cl.
CPC ................. *G06Q 50/01* (2013.01); *H04L 67/12* (2013.01); *H04L 67/306* (2013.01); *A63F 2300/556* (2013.01); *A63F 2300/5566* (2013.01); *A63F 13/12* (2013.01)
USPC ....................................................... 709/204

(58) Field of Classification Search
None
See application file for complete search history.

(56) References Cited

U.S. PATENT DOCUMENTS

| | | | |
|---|---|---|---|
| 6,681,108 | B1 | 1/2004 | Terry |
| 2004/0250089 | A1 | 12/2004 | Ochi |
| 2005/0257254 | A1 | 11/2005 | Hamada |
| 2006/0030263 | A1* | 2/2006 | Seligmann et al. .......... 455/41.2 |
| 2007/0037574 | A1* | 2/2007 | Libov et al. ................ 455/435.2 |
| 2007/0282954 | A1* | 12/2007 | Kim et al. ..................... 709/206 |
| 2008/0172734 | A1 | 7/2008 | Sugimoto |
| 2008/0227552 | A1 | 9/2008 | Shimomura |
| 2009/0185527 | A1* | 7/2009 | Akhtar et al. ................. 370/329 |
| 2009/0265429 | A1* | 10/2009 | Gestsson et al. ............. 709/204 |
| 2011/0047384 | A1* | 2/2011 | Jacobs et al. ................. 713/176 |

FOREIGN PATENT DOCUMENTS

| | | |
|---|---|---|
| EP | 0976431 A1 | 2/2000 |
| JP | 2002163353 A | 6/2002 |
| JP | 2003186840 A | 7/2003 |
| JP | 2008220645 A | 9/2008 |
| JP | 2009037470 A | 2/2009 |
| JP | 2009195686 A | 9/2009 |

OTHER PUBLICATIONS

International Search Report for corresponding PCT application PCT/JP2010/065240, dated Nov. 16, 2010.
International Preliminary Report on Patentability and Written Opinion for corresponding PCT application PCT/JP2010/065240, dated Apr. 19, 2012.
Office Action for corresponding Japanese Patent Application No. 2011-530830, dated Jul. 30, 2013.
Office Action for corresponding Chinese Patent Application No. 2010800403534, dated Feb. 8, 2014.

* cited by examiner

*Primary Examiner* — Ario Etienne
*Assistant Examiner* — Clayton R Williams

(74) *Attorney, Agent, or Firm* — Matthew B. Dernier, Esq.; Gibson & Dernier LLP (57) ABSTRACT

Provided is an information processing system capable of reflecting the relationship between users, which has been established by exchanging data between information processing terminals, to an information processing device. A first information processing terminal receives identification data which identifies a user who operates a second information processing terminal from the second information processing terminal. The first information processing terminal transmits, to an information processing device, identification data which identifies a user who operates the first information processing terminal and the identification data which identifies the user who operates the second information processing terminal in association with each other. The information processing device associates, based on the received identification data, the user who operates the first information processing terminal and the user who operates the second information processing terminal.

17 Claims, 6 Drawing Sheets

INFORMATION PROCESSING SYSTEM, INFORMATION PROCESSING METHOD, INFORMATION PROCESSING DEVICE, INFORMATION PROCESSING DEVICE CONTROL METHOD, INFORMATION PROCESSING TERMINAL, INFORMATION PROCESSING TERMINAL CONTROL METHOD, INFORMATION STORAGE MEDIUM AND PROGRAM

TECHNICAL FIELD

The present invention relates to an information processing system, an information processing method, an information processing device, a control method for an information processing device, an information processing terminal, a control method for an information processing terminal, an information storage medium, and a program.

BACKGROUND ART

There have been known network services that enable data such as audio, video, and messages to be exchanged between users via a network. In such network services, for example, account data of each user is stored in an information processing device such as a server, and pieces of the account data corresponding to users, who are allowed to exchange data with each other, are associated with each other. For the users who are allowed to exchange data with each other, when one of the users transmits data such as a message to the information processing device by specifying the other user, the information processing device receives the data and transmits the received data to the other user.

There have also been known portable game machines. Patent Literature 1 discloses a technology that enables a game to be executed based on a program downloaded from a master, in a state in which power supply from the master is cut off. There have also been known technologies for exchanging data between information processing terminals such as the portable game machines, mobile phones, and small personal computers by peer-to-peer (P2P) communication using infrared ray, wireless LAN, or the like, for example, without being mediated by an information processing device such as a server.

CITATION LIST

Patent Literature

[Patent Literature 1]: EP 0976431 A1

SUMMARY OF INVENTION

Technical Problem

When a relationship between users established by exchanging data between information processing terminals such as portable game machines, for example, is also available in a network service and the like provided by an information processing device, convenience of the users utilizing the network service is improved.

The present invention has been made in view of the above-mentioned problem, and therefore has an object to provide an information processing system, an information processing method, an information processing device, an information processing terminal, an information storage medium, and a program capable of reflecting the relationship between the users, which has been established by exchanging data between the information processing terminals, to the information processing device.

Solution to Problem

In order to solve the above-mentioned problem, according to the present invention, there is provided an information processing system, including: an information processing device; and an information processing terminal, the information processing terminal including: own terminal operating user identification data storage means for storing identification data which identifies a user who operates the information processing terminal of interest; other terminal operating user identification data receiving means for receiving identification data which identifies a user who operates another information processing terminal from the another information processing terminal; other terminal operating user identification data storage means for storing the identification data which identifies the user who operates the another information processing terminal; and identification data transmitting means for transmitting, to the information processing device, the identification data which identifies the user who operates the information processing terminal of interest and the identification data which identifies the user who operates the another information processing terminal in association with each other, the information processing device including: identification data receiving means for receiving the identification data transmitted by the identification data transmitting means; and user association means for associating, based on the identification data received by the identification data receiving means, the user who operates the information processing terminal of interest and the user who operates the another information processing terminal.

Further, according to the present invention, there is provided an information processing method, including: a step of storing, by an information processing terminal, identification data which identifies a user who operates the information processing terminal of interest in own terminal operating user identification data storage means; an other terminal operating user identification data receiving step of receiving, by the information processing terminal, identification data which identifies a user who operates another information processing terminal from the another information processing terminal; a step of storing, by the information processing terminal, the identification data which identifies the user who operates the another information processing terminal in other terminal operating user identification data storage means; an identification data transmitting step of transmitting, by the information processing terminal, to an information processing device, the identification data which identifies the user who operates the information processing terminal of interest and the identification data which identifies the user who operates the another information processing terminal in association with each other; an identification data receiving step of receiving, by the information processing device, the identification data transmitted in the identification data transmitting step; and a user association step of associating, by the information processing device, based on the identification data received in the identification data receiving step, the user who operates the information processing terminal of interest and the user who operates the another information processing terminal.

Further, according to the present invention, there is provided an information processing device capable of communicating with respect to an information processing terminal, the information processing terminal including: own terminal operating user identification data storage means for storing identification data which identifies a user who operates the information processing terminal itself; other terminal operating user identification data receiving means for receiving identification data which identifies a user who operates another information processing terminal from the another information processing terminal; other terminal operating user identification data storage means for storing the identification data which identifies the user who operates the another information processing terminal; and identification data transmitting means for transmitting the identification data which identifies the user who operates the another information processing terminal and the identification data which identifies the user who operates the information processing terminal itself in association with each other, the information processing device including: identification data receiving means for receiving the identification data transmitted from the identification data transmitting means; and user association means for associating, based on the identification data received by the identification data receiving means, the user who operates the information processing terminal with respect to which the information processing device is capable of communicating and the user who operates the another information processing terminal.

Further, according to the present invention, there is provided a control method for an information processing device capable of communicating with respect to an information processing terminal, the information processing terminal including: own terminal operating user identification data storage means for storing identification data which identifies a user who operates the information processing terminal itself; other terminal operating user identification data receiving means for receiving identification data which identifies a user who operates another information processing terminal from the another information processing terminal; other terminal operating user identification data storage means for storing the identification data which identifies the user who operates the another information processing terminal; and identification data transmitting means for transmitting the identification data which identifies the user who operates the another information processing terminal and the identification data which identifies the user who operates the information processing terminal itself in association with each other, the control method including: an identification data receiving step of receiving the identification data transmitted from the identification data transmitting means; and a user association step of associating, based on the identification data received in the identification data receiving step, the user who operates the information processing terminal with respect to which the information processing device is capable of communicating and the user who operates the another information processing terminal.

Further, according to the present invention, there is provided an information storage medium having stored thereon a program for causing a computer to function as an information processing device capable of communicating with respect to an information processing terminal, the information processing terminal including: own terminal operating user identification data storage means for storing identification data which identifies a user who operates the information processing terminal itself; other terminal operating user identification data receiving means for receiving identification data which identifies a user who operates another information processing terminal from the another information processing terminal; other terminal operating user identification data storage means for storing the identification data which identifies the user who operates the another information processing terminal; and identification data transmitting means for transmitting the identification data which identifies the user who operates the another information processing terminal and the identification data which identifies the user who operates the information processing terminal itself in association with each other, the program causing the computer to function as: identification data receiving means for receiving the identification data transmitted from the identification data transmitting means; and user association means for associating, based on the identification data received by the identification data receiving means, the user who operates the information processing terminal with respect to which the information processing device is capable of communicating and the user who operates the another information processing terminal.

Further, according to the present invention, there is provided a program for causing a computer to function as an information processing device capable of communicating with respect to an information processing terminal, the information processing terminal including: own terminal operating user identification data storage means for storing identification data which identifies a user who operates the information processing terminal itself; other terminal operating user identification data receiving means for receiving identification data which identifies a user who operates another information processing terminal from the another information processing terminal; other terminal operating user identification data storage means for storing the identification data which identifies the user who operates the another information processing terminal; and identification data transmitting means for transmitting the identification data which identifies the user who operates the another information processing terminal and the identification data which identifies the user who operates the information processing terminal itself in association with each other, the program further causing the computer to function as: identification data receiving means for receiving the identification data transmitted from the identification data transmitting means; and user association means for associating, based on the identification data received by the identification data receiving means, the user who operates the information processing terminal with respect to which the information processing device is capable of communicating and the user who operates the another information processing terminal.

Further, according to the present invention, there is provided an information processing terminal capable of communicating with respect to an information processing device, including: own terminal operating user identification data storage means for storing identification data which identifies a user who operates the information processing terminal of interest; other terminal operating user identification data receiving means for receiving identification data which identifies a user who operates another information processing terminal from the another information processing terminal; other terminal operating user identification data storage means for storing the identification data which identifies the user who operates the another information processing terminal; and identification data transmitting means for transmitting, to the information processing device which associates the user who operates the information processing terminal of interest and the user who operates the another information processing terminal with each other based on received data, the identification data which identifies the user who operates the information processing terminal of interest and the identification data which identifies the user who operates the another information processing terminal in association with each other.

Further, according to the present invention, there is provided a control method for an information processing terminal capable of communicating with respect to an information processing device, the control method including: a step of storing identification data which identifies a user who operates the information processing terminal of interest in own terminal operating user identification data storage means; an other terminal operating user identification data receiving step of receiving identification data which identifies a user who operates another information processing terminal from the another information processing terminal; a step of storing the identification data which identifies the user who operates the another information processing terminal in other terminal operating user identification data storage means; and an identification data transmitting step of transmitting, to the information processing device which associates the user who operates the information processing terminal of interest and the user who operates the another information processing terminal with each other based on received data, the identification data which identifies the user who operates the information processing terminal of interest and the identification data which identifies the user who operates the another information processing terminal in association with each other.

Further, according to the present invention, there is provided another information storage medium having stored thereon a program for causing a computer to function as an information processing terminal capable of communicating with respect to an information processing device, the program further causing the computer to function as: means for storing identification data which identifies a user who operates the information processing terminal of interest in own terminal operating user identification data storage means; other terminal operating user identification data receiving means for receiving identification data which identifies a user who operates another information processing terminal from the another information processing terminal; means for storing the identification data which identifies the user who operates the another information processing terminal in other terminal operating user identification data storage means; and identification data transmitting means for transmitting, to the information processing device which associates the user who operates the information processing terminal of interest and the user who operates the another information processing terminal with each other based on received data, the identification data which identifies the user who operates the information processing terminal of interest and the identification data which identifies the user who operates the another information processing terminal in association with each other.

Further, according to the present invention, there is provided another program for causing a computer to function as an information processing terminal capable of communicating with respect to an information processing device, the program further causing the computer to function as: means for storing identification data which identifies a user who operates the information processing terminal of interest in own terminal operating user identification data storage means; other terminal operating user identification data receiving means for receiving identification data which identifies a user who operates another information processing terminal from the another information processing terminal; means for storing the identification data which identifies the user who operates the another information processing terminal in other terminal operating user identification data storage means; and identification data transmitting means for transmitting, to the information processing device which associates the user who operates the information processing terminal of interest and the user who operates the another information processing terminal with each other based on received data, the identification data which identifies the user who operates the information processing terminal of interest and the identification data which identifies the user who operates the another information processing terminal in association with each other.

According to the present invention, the information processing terminal stores the identification data which identifies the user who operates the information processing terminal. The information processing terminal stores the identification data which identifies the user who operates the another information processing terminal, which is received from the another information processing terminal. The information processing terminal transmits the identification data which identifies the user who operates the information processing terminal and the identification data which identifies the user who operates the another information processing terminal in association with each other to the information processing device. The information processing device associates the users who operate the plurality of information processing terminals, respectively, based on the received data. Therefore, according to the present invention, the relationship between the users, which has been established by exchanging data between the information processing terminals, may be reflected to the information processing device.

In one aspect of the present invention, the other terminal operating user identification data storage means stores a plurality of identification data, each identification data corresponds to one of a plurality of other information processing terminals, and identifies a user who operates the corresponding other information processing terminal, the identification data transmitting means transmits, to the information processing device, the plurality of identification data, each identification data identifies the user who operates the corresponding other information processing terminal and the identification data which identifies the user who operates the information processing terminal of interest in association with each other, and the user association means associates the user who operates the information processing terminal of interest and the users, each user operates the corresponding other information processing terminals. With this configuration, the relationship between the user who operates an information processing terminal of interest and the users, each user operates the corresponding other information processing terminal, may be reflected to the information processing device at once.

Further, in another aspect of the present invention, the information processing device further includes account data generation means for generating, upon request of a user, account data of the user associated with an information processing terminal operated by the user, and the user association means associates account data of the user who operates the information processing terminal of interest with account data of the user who operates the another information processing terminal. With this configuration, the relationship between the users, which has been established by exchanging data between the information processing terminals, may be reflected on the relationship between the pieces of account data, which is generated on the request from the user.

In this aspect, under the condition that the account data generation means generates the account data, the user association means may associate the account data with another piece of account data. With this configuration, at under the condition that generating the account data, the relationship between the users, which has been established by exchanging data between the information processing terminals, may be reflected on the relationship between the pieces of account data.

Further, in still another aspect of the present invention, the account data is associated with a plurality of information processing terminals, and the user association means associates each information processing terminal associated with account data corresponding to the user who operates the information processing terminal of interest and each information processing terminal associated with the account data corresponding to the user who operates the another information processing terminal. With this configuration, the relationship between the users, which has been established by exchanging data between the information processing terminals, may be reflected on the relationship between the information processing terminals, which are operated by the users who have established the relationship, other than the information processing terminals with which data is exchanged when the relationship between the users is established.

In this aspect, the information processing device may further include: information processing terminal association means for associating the account data with a new information processing terminal; and transmitting means for transmitting, under the condition that the new information processing terminal is associated, the identification data which identifies the user who operates the another information processing terminal to the new information processing terminal. With this configuration, the relationship between the users, which has been established by exchanging data between the information processing terminals, may be reflected on the relationship between the information processing terminals, which are operated by the users who have established the relationship, other than the information processing terminals with which data is exchanged when the relationship between the users is established.

Further, in still another aspect of the present invention, the own terminal operating user identification data storage means stores the identification data which identifies the user who operates the information processing terminal of interest with an identifier of the account data of the user, the other terminal operating user identification data receiving means receives the identification data which identifies the user who operates the another information processing terminal associated with an identifier of the account data of the user who operates the another information processing terminal, the other terminal operating user identification data storage means stores the identifier of the account data of the user who operates the another information processing terminal in association with the identification data which identifies the user who operates the another information processing terminal, under the condition that the identifier of the account data of the user who operates the information processing terminal of interest is stored in the own terminal operating user identification data storage means and the identifier of the account data of the user who operates the another information processing terminal is stored in the other terminal operating user identification data storage means, instead of transmitting the identification data, the identification data transmitting means transmits, to the information processing device, the identifier of the account data of the user who operates the information processing terminal of interest and the identifier of the account data of the user who operates the another information processing terminal in association with each other, the identification data receiving means receives the identifiers of the account data transmitted by the identification data transmitting means, and the user association means associates, based on the identifiers of the account data received by the identification data receiving means, the account data of the user who operates the information processing terminal of interest and the account data of the user who operates the another information processing terminal.

Further, in still another aspect of the present invention, the identification data contains an identifier unique to an information processing terminal corresponding to the identification data. With this configuration, it is ensured that identification data is different for each of the information processing terminals.

DESCRIPTION OF EMBODIMENT

Hereinafter, an embodiment of the present invention is described in detail with reference to the accompanying drawings.

Figure 1:
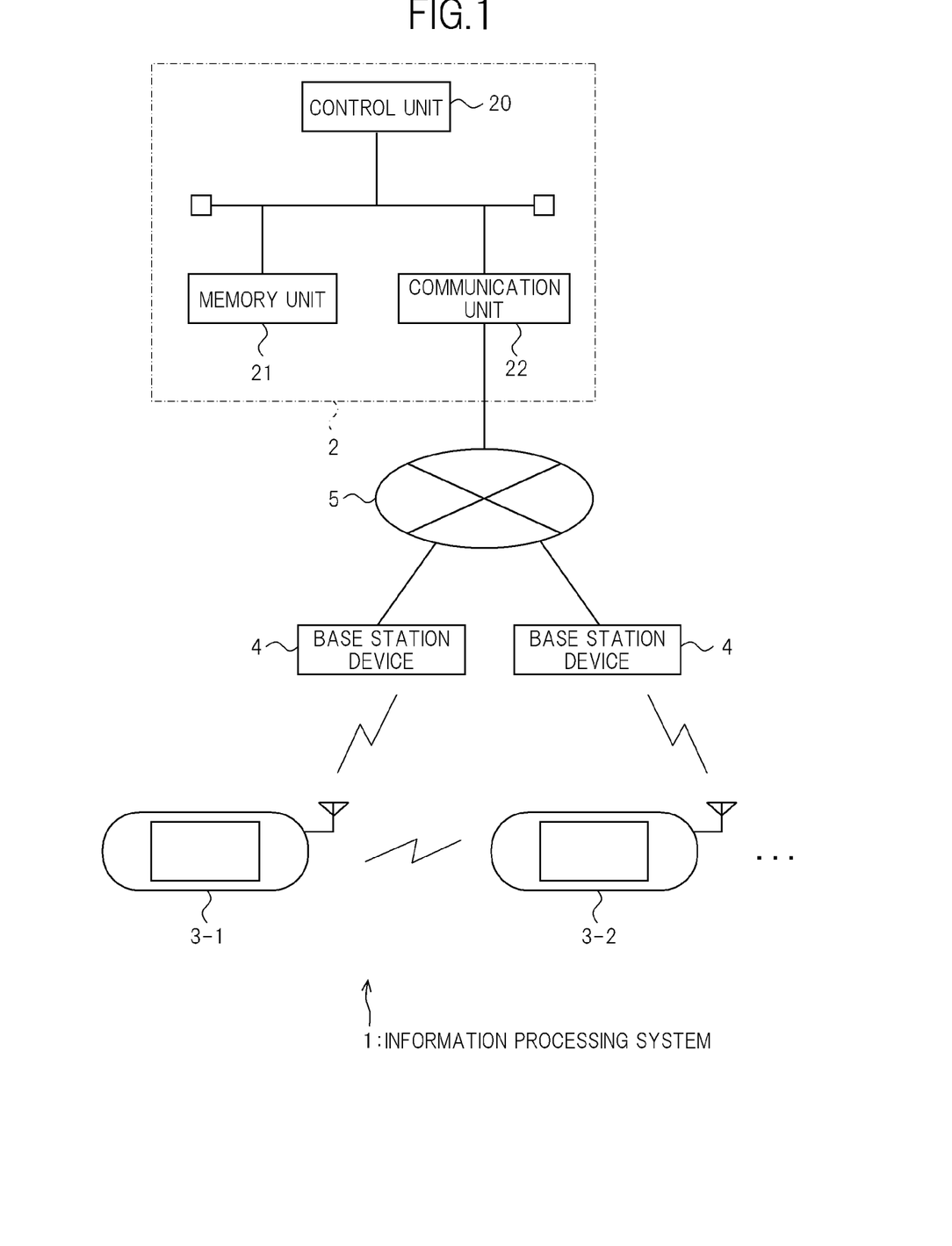
FIG. 1 is a diagram illustrating an example of a network configuration of an information processing system according to an embodiment of the present invention.

FIG. 1 is a diagram illustrating an example of a network configuration of an information processing system 1 according to an embodiment of the present invention. As illustrated in FIG. 1, the information processing system 1 includes, an information processing device 2 (in this embodiment, a server, for example), a plurality of information processing terminals 3 (3-1, 3-2, . . . ), and base station devices (access points) 4, for example.

The information processing device 2 includes a control unit 20, a memory unit 21, and a communication unit 22, for example.

Figure 2:
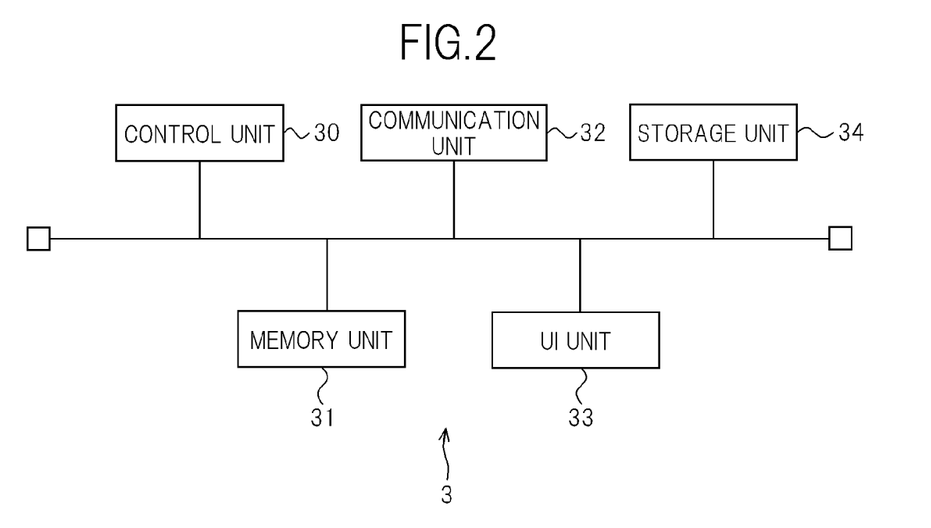
FIG. 2 is a diagram illustrating an example of a hardware configuration of an information processing terminal according to an embodiment of the present invention.

FIG. 2 is a diagram illustrating an example of a hardware configuration of an information processing terminal 3 according to this embodiment. As illustrated in FIG. 2, the information processing terminal 3 includes a control unit 30, a memory unit 31, a communication unit 32, a user interface (UI) unit 33, and a storage unit 34. The information processing terminal 3 is specifically a portable game machine, a mobile phone, or a small personal computer, for example.

The base station devices 4 are computers that function as communication relay devices (access point devices), for example.

The control unit 20 of the information processing device 2 and the control unit 30 of the information processing terminal 3 are program control devices such as CPUs, for example. The memory unit 21 of the information processing device 2 and the memory unit 31 of the information processing terminal 3 are memory elements such as ROMs or RAMs or hard disk drives, for example. The memory unit 21 of the information processing device 2 stores a program to be executed by the control unit 20 of the information processing device 2, and the like. The memory unit 21 of the information processing device 2 also operates as a working memory for the control unit 20 of the information processing device 2. The memory unit 31 of the information processing terminal 3 stores a program to be executed by the control unit 30 of the information processing terminal 3, and the like. The memory unit 31 of the information processing terminal 3 also operates as a working memory for the control unit 30 of the information processing terminal 3. The memory unit 31 of the information processing terminal 3 also holds the program (for example, game program) read from the storage unit 34.

The communication unit 22 of the information processing device 2 and the communication unit 32 of the information processing terminal 3 are communication interfaces such as network boards or network cards, for example.

The communication unit 32 of the information processing terminal 3 transmits/receives data to/from the communication unit 22 of the information processing device 2 and the communication unit 32 of another information processing terminal 3 via a base station device 4. It is also possible for the communication units 32 of the information processing terminals 3 to directly communicate with each other to transmit/receive data. Hereinafter, the communication via the base station device 4 is referred to as communication in an infrastructure mode, and the communication without being mediated by the base station devices 4 is referred to as communication in an ad-hoc mode. Note that, a communication path in the above-mentioned communication may be wired or wireless.

The UI unit 33 of the information processing terminal 3 is a display, a speaker, a mouse, a keyboard, a game controller, a remote controller, and a button, for example, and outputs contents of operation performed by the user and sound input by the user to the control unit 30 of the information processing terminal 3. The UI unit 33 of the information processing terminal 3 also outputs information for display or as audio in accordance with an instruction input from the control unit 30 of the information processing terminal 3.

The storage unit 34 of the information processing terminal 3 is an optical disc drive such as a UMD (registered trademark) drive, a DVD-ROM drive, or a Blu-ray (registered trademark) disc drive, a memory element such as a flash memory, or a hard disk drive, for example, and reads information such as a program from a storage medium such as a UMD, a DVD, or a Blu-ray disc, the memory element such as the flash memory, or a hard disk to be output to the control unit 30 of the information processing terminal 3.

Figure 3:
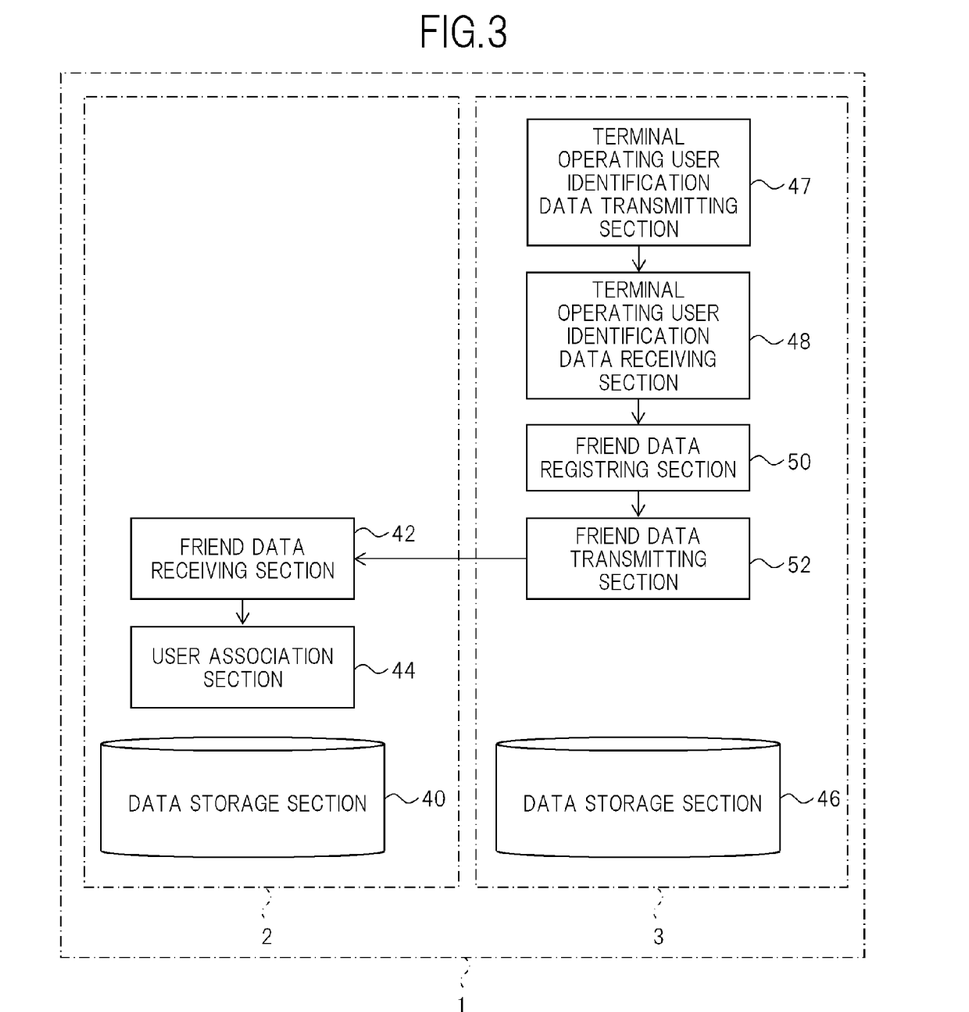
FIG. 3 is a functional block diagram illustrating an example of functions implemented by the information processing system according to an embodiment of the present invention.

FIG. 3 is a functional block diagram illustrating an example of main functions implemented by the information processing system 1 according to this embodiment. As illustrated in FIG. 3, the information processing device 2 included in the information processing system 1 according to this embodiment functionally includes a data storage section 40, a friend data receiving section 42, and a user association section 44. The data storage section 40 is implemented mainly by the memory unit 21 of the information processing device 2. The friend data receiving section 42 is implemented mainly by the communication unit 22 of the information processing device 2. The user association section 44 is implemented mainly by the control unit 20 of the information processing device 2.

Similarly, the information processing terminal 3 according to this embodiment functionally includes a data storage section 46, a terminal operating user identification data transmitting section 47, a terminal operating user identification data receiving section 48, a friend data registering section 50, and a friend data transmitting section 52. The data storage section 46 is implemented mainly by the memory unit 31 of the information processing terminal 3. The friend data registering section 50 is implemented mainly by the control unit 30 of the information processing terminal 3. The terminal operating user identification data transmitting section 47, the terminal operating user identification data receiving section 48, and the friend data transmitting section 52 are implemented mainly by the communication unit 32 of the information processing terminal 3.

Those elements are achieved by executing a program installed in the information processing device 2 and the information processing terminal 3, which are computers, by the control unit 20 of the information processing device 2 and the control unit 30 of the information processing terminal 3. The program is supplied to the information processing device 2 and the information processing terminal 3 via a computer-readable information transmitting medium such as a CD-ROM or a DVD-ROM, for example, or via a communication network such as the Internet. In this embodiment, the information processing terminal 3 also executes a program (for example, game program) read from the storage unit 34 of the information processing terminal 3, for example.

[Data Exchange by Communication in Ad-Hoc Mode]

First, data exchange by communication in the ad-hoc mode is described. In this example, the data storage section 46 of each of the information processing terminals 3 stores in advance the terminal operating user identification data 54 illustrated in FIG. 4. The terminal operating user identification data 54 contains an individual ID 56, which is an identifier unique to the information processing terminal 3, and intra-terminal user name data 58 indicating the name of the user within the information processing terminal 3, for example. In this embodiment, it is assumed that the name of the user who operates a first information processing terminal 3-1 is "A", and the name of the user who operates a second information processing terminal 3-2 is "B", for example. It is also assumed that the data storage section 46 of the first information processing terminal 3-1 stores the terminal operating user identification data 54 containing the individual ID 56 of the value "0001" and the intra-terminal user name data 58 of the value "A". It is also assumed that the data storage section 46 of the second information processing terminal 3-2 stores the terminal operating user identification data 54 containing the individual ID 56 of the value "0002" and the intra-terminal user name data 58 of the value "B".

Figure 5:
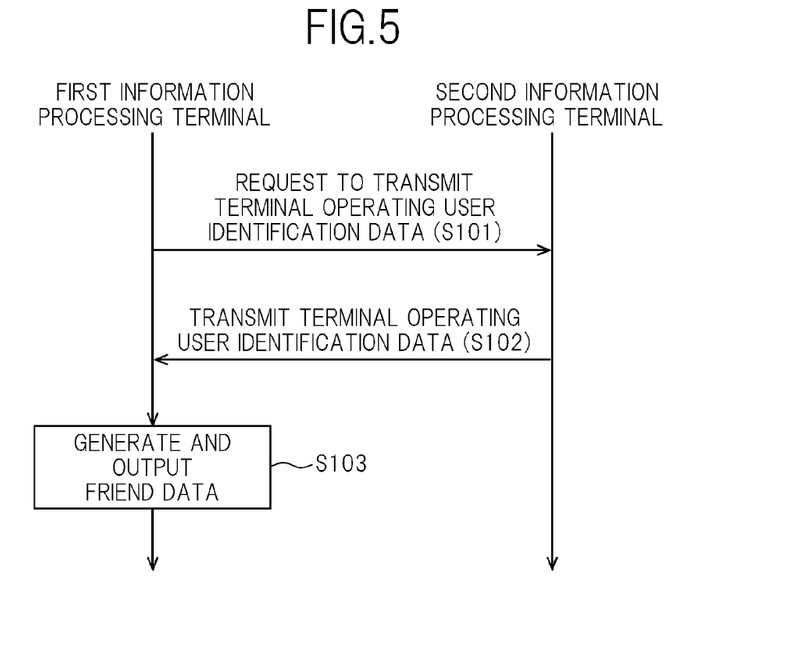
FIG. 5 is a flow chart illustrating an example of a flow of processing performed in the information processing system according to an embodiment of the present invention.

Next, referring to a flow chart of FIG. 5, an example of a flow of processing of registering the terminal operating user identification data 54 of the user B with the first information processing terminal 3-1 is described.

Figure 6:
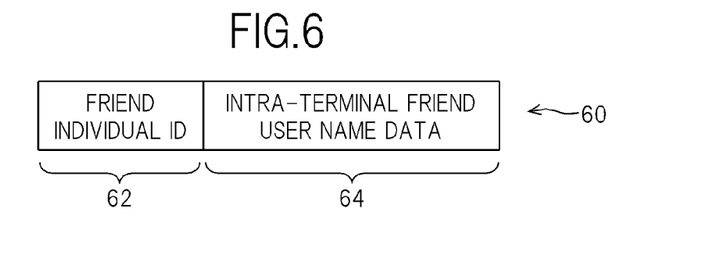
FIG. 6 is a diagram illustrating an example of a data structure of friend data.

First, the first information processing terminal 3-1 transmits to the second information processing terminal 3-2 a request to transmit the terminal operating user identification data 54 of the second information processing terminal 3-2, and the second information processing terminal 3-2 receives the transmission request (S101). Then, the terminal operating user identification data transmitting section 47 of the second information processing terminal 3-2 transmits to the first information processing terminal 3-1 the terminal operating user identification data 54 of the user B, and the terminal operating user identification data receiving section 48 of the first information processing terminal 3-1 receives the terminal operating user identification data 54 (S102). Then, the friend data registering section 50 of the first information processing terminal 3-1 generates friend data 60 illustrated in FIG. 6 based on the terminal operating user identification data 54 received in the processing of S102, and outputs the generated friend data 60 to the data storage section 46 of the first information processing terminal 3-1 (S103). FIG. 6 is a diagram illustrating an example of a data structure of the friend data 60. As illustrated in FIG. 6, the friend data 60 contains a friend individual ID 62 and intra-terminal friend user name data 64. The friend individual ID 62 corresponds to the individual ID 56 contained in the terminal operating user identification data 54 received in the processing denoted by S102, and the intra-terminal friend user name data 64 corresponds to the intra-terminal user name data 58 contained in the terminal operating user identification data 54 received in the processing denoted by S102. In other words, in this processing example, the friend data 60 containing the friend individual ID 62 of the value "0002" and the intra-terminal friend user name data 64 of the value "B" is generated. Therefore, in this embodiment, the data storage section 46 of the information processing terminal 3 stores the terminal operating user identification data 54 for identifying the user who operates another information processing terminal 3 as the friend data 60.

As described above, the terminal operating user identification data 54 for identifying the user who operates the second information processing terminal 3-2 is registered with the first information processing terminal 3-1.

[Processing of Registering Data with Server by Communication in Infrastructure Mode]

Figure 7:
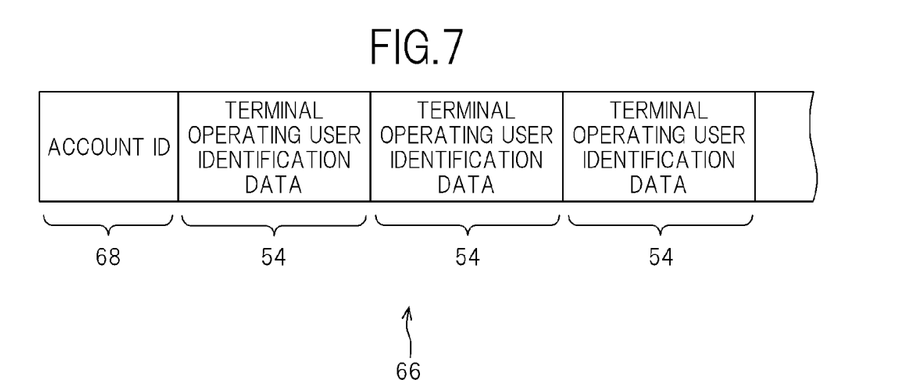
FIG. 7 is a diagram illustrating an example of a data structure of account data.

Next, processing of registering data with the information processing device 2 by communication in the infrastructure mode is described. In this embodiment, the information processing device 2 executes in advance a network service program for providing the user who operates the information processing terminal 3 with a network service. The data storage section 40 of the information processing device 2 stores account data 66 corresponding to the users who operate the information processing terminals 3, for use in the network service. FIG. 7 is a diagram illustrating an example of a data structure of the account data 66. As illustrated in FIG. 7, the account data 66 contains an account ID 68, which is an identifier of the account data 66, and at least one piece of the terminal operating user identification data 54 corresponding to the account data 66. In this embodiment, for example, the account data 66 corresponding to the user A contains the terminal operating user identification data 54 corresponding to the user A. Similarly, the account data 66 corresponding to the user B contains the terminal operating user identification data 54 corresponding to the user B.

Figure 8:
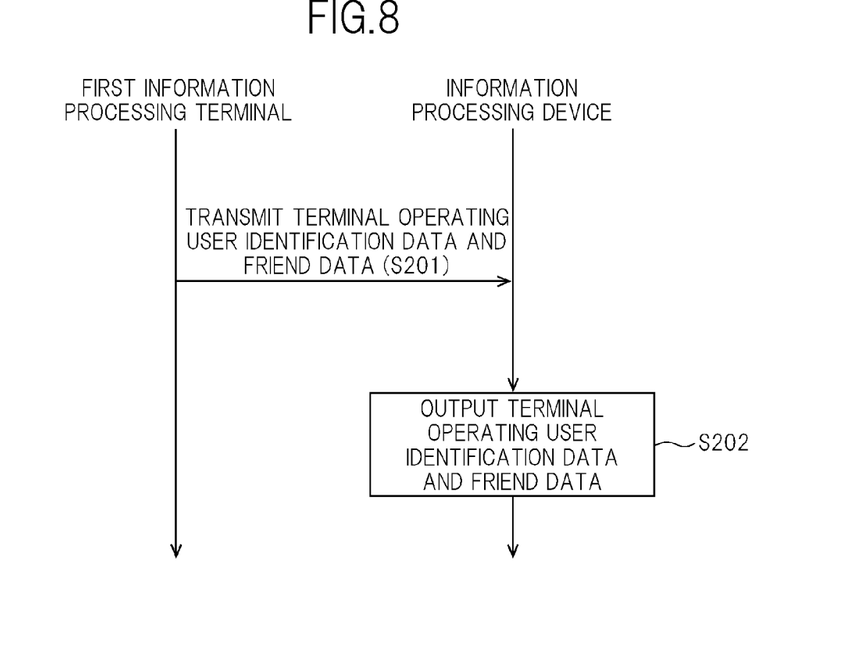
FIG. 8 is a flow chart illustrating an example of a flow of processing performed by the information processing system according to an embodiment of the present invention.

Next, referring to a flow chart illustrated in FIG. 8, an example of a flow of processing of registering data from the first information processing terminal 3-1 with the information processing device 2 is described. Note that, in this processing example, it is assumed that the processing illustrated in the flow chart of FIG. 5 described above has been completed, and that the data storage section 46 of the first information processing terminal 3-1 stores the terminal operating user identification data 54 corresponding to the user A and the friend data 60 corresponding to the user B.

First, the friend data transmitting section 52 of the first information processing terminal 3-1 transmits, to the information processing device 2, the friend data 60 stored in the data storage section 46 of the first information processing terminal 3-1 (corresponding to the terminal operating user identification data 54 of the second information processing terminal 3-2) in association with the terminal operating user identification data 54 stored in the data storage section 46 of the first information processing terminal 3-1 (the terminal operating user identification data 54 of the first information processing terminal 3-1), and the friend data receiving section 42 of the information processing device 2 receives those pieces of data (S201). Then, the user association section 44 of the information processing device 2 associates the received terminal operating user identification data 54 and the received friend data 60 to be output to the data storage section 40 of the information processing device 2 (S202).

In this embodiment, as described above, the account data 66 corresponding to the user A contains the terminal operating user identification data 54 corresponding to the user A, and the account data 66 corresponding to the user B contains the terminal operating user identification data 54 corresponding to the user B. Through the processing denoted by S201 and S202 described above, the terminal operating user identification data 54 corresponding to the user A and the friend data 60 corresponding to the user B are associated with each other to be stored in the data storage section 40 of the information processing device 2. In this manner, in this embodiment, the account data 66 corresponding to the user A and the account data 66 corresponding to the user B are associated with each other.

As described above, in this embodiment, in a place where there is no base station device 4 nearby, for example, users who played a game together may exchange the terminal operating user identification data 54 by communication in the ad-hoc mode, and register the friend data 60 with the information processing terminal 3. Thereafter, the friend data 60 may be extracted from the information processing terminal 3 to the information processing device 2.

Figure 9:
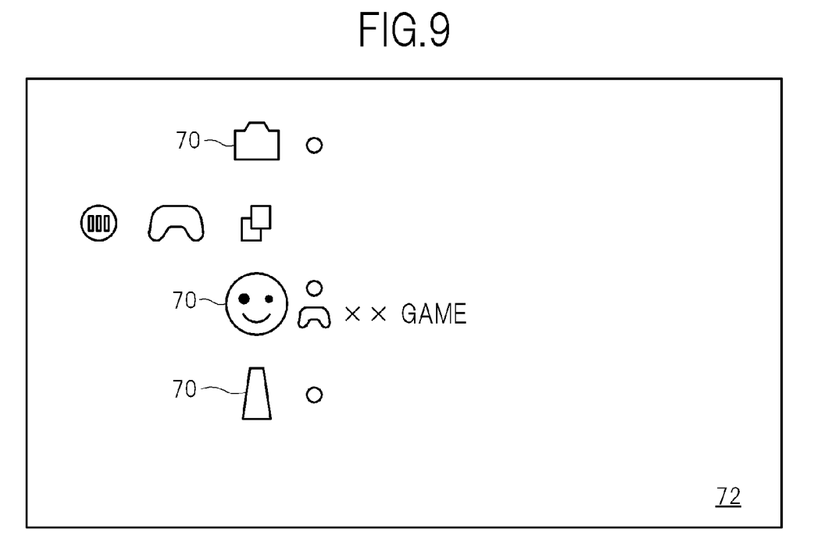
FIG. 9 is a diagram illustrating an example of a message transmitting screen.

Specifically, for example, in a service provided by the information processing device 2, for transmitting messages between the users via the information processing device 2, the user of the information processing terminal 3 may transmit messages to the user with whom the account data 66 is associated as described above. In this case, for example, as illustrated in FIG. 9, a message transmitting screen 72 including user icons 70 corresponding to the users to whom a message can be transmitted is output to the UI unit 33 of the information processing terminal 3 for display. Accordingly, the user may select a destination of a message.

Note that, in this embodiment, the account data 66 may contain a plurality of pieces of the terminal operating user identification data 54. Therefore, even in a case where the above-mentioned network service is used from an information processing terminal 3, game apparatus, or the like other than the information processing terminal 3 used when the friend data 60 is registered, the user to whom a message can be transmitted may be identified based on the account data 66, and the message transmitting screen 72 including the user icons 70 corresponding to the users, respectively, may be output to the information processing terminal 3 or game apparatus for display.

Note that, the present invention is not limited to the above-mentioned embodiment. Hereinafter, modified examples of the above-mentioned embodiment are described.

First Modified Example

Batch Registration of a Plurality of Pieces of Friend Data

In a first modified example, for example, before performing the processing denoted by S201 and S202 described above, the data storage section 46 of the first information processing terminal 3-1 stores in advance a plurality of pieces of the friend data 60. Then, in the processing denoted by S201 described above, the friend data transmitting section 52 of the first information processing terminal 3-1 transmits, to the information processing device 2, the plurality of pieces of the friend data 60 stored in the data storage section 46 of the first information processing terminal 3-1 in association with the terminal operating user identification data 54 stored in the data storage section 46 of the first information processing terminal 3-1, and the friend data receiving section 42 of the information processing device 2 receives those pieces of data. Then, in the processing denoted by S202 described above, the information processing device 2 outputs those pieces of data to the data storage section 40 of the information processing device 2. In this modified example, the plurality of pieces of the friend data 60 registered with the first information processing terminal 3-1 may be extracted to the information processing device 2 at once.

Second Modified Example

Generation of Account Data

Figure 10:
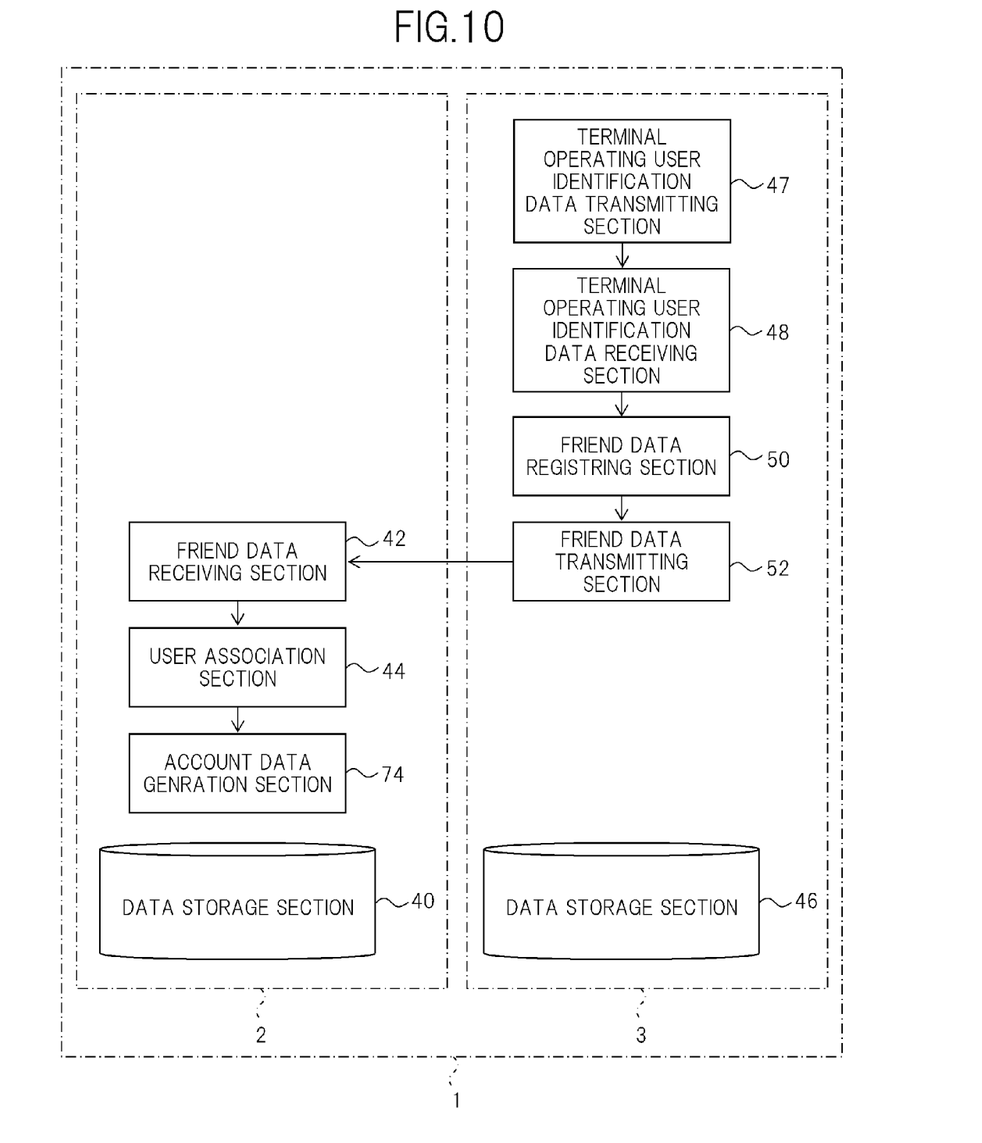
FIG. 10 is a functional block diagram illustrating an example of functions implemented by an information processing system of a modified example.

FIG. 10 is a functional block diagram illustrating an example of main functions implemented by an information processing system 1 of a second modified example. In this modified example, the information processing device 2 includes an account data generation section 74 for generating the account data 66 corresponding to a user upon request of the user. Other components are similar to those of the information processing system 1 according to the above-mentioned embodiment.

In this modified example, the account data 66 corresponding to the user A is stored in the data storage section 40 of the information processing device 2. Further, through the processing denoted by S201 and S202 described above, the data storage section 40 of the information processing device 2 stores the terminal operating user identification data 54 corresponding to the user A and the friend data 60 corresponding to the user B in association with each other.

Then, in this modified example, the second information processing terminal 3-2 transmits, to the information processing device 2, a request to generate the account data 66 corresponding to the user B, and the information processing device 2 receives this request. Then, the account data generation section 74 of the information processing device 2 generates the account data 66 corresponding to the user B, and outputs the generated account data 66 to the data storage section 40 of the information processing device 2.

As described above, in this modified example, when the account data 66 corresponding to the user B is generated, the data storage section 40 of the information processing device 2 stores the account data 66 corresponding to the user A, the account data 66 corresponding to the user B, and the terminal operating user identification data 54 corresponding to the user A, which is associated with the friend data 60 corresponding to the user B. In this manner, in this modified example, under the condition that the account data 66 corresponding to the user B is generated, the account data 66 corresponding to the user A and the account data 66 corresponding to the user B are associated with each other.

Third Modified Example

Extraction of Friend Data Under the Condition that Generating Account Data

Also in a third modified example, as illustrated in FIG. 10, the information processing device 2 includes the account data generation section 74 for generating the account data 66 corresponding to a user upon request of the user.

In this modified example, the account data 66 is not stored in the data storage section 40 of the information processing device 2 in advance. Further, before performing the processing denoted by S201 and S202 described above, the data storage section 46 of the first information processing terminal 3-1 stores in advance the terminal operating user identification data 54 and the friend data 60 in association with each other.

Then, in this modified example, in the processing denoted by S201 described above, the first information processing terminal 3-1 transmits, to the information processing device 2, the terminal operating user identification data 54 associated with the friend data 60 along with a request to generate the account data 66 corresponding to the user A, and the information processing device 2 receives those pieces of data. Then, the user association section 44 of the information processing device 2 executes the processing denoted by S202 described above, and the account data generation section 74 of the information processing device 2 executes processing of generating the account data 66 corresponding to the user A.

As described above, in this modified example, the generation of the account data 66 may be performed along with the extraction of the friend data 60 to the information processing device 2.

Fourth Modified Example

Extraction of Data to Information Processing Terminal

In a fourth modified example, the account data generation section 74 of the information processing device 2 adds, updates, and deletes the terminal operating user identification data 54 with respect to the account data 66 upon request of a user. In this manner, addition, update, and deletion of the information processing terminal 3 associated with the account data 66 may be performed.

In this modified example, it is assumed that the data storage section 40 of the information processing device 2 stores the account data 66 corresponding to the user A, which contains the terminal operating user identification data 54 corresponding to the first information processing terminal 3-1. It is also assumed that the data storage section 40 of the information processing device 2 stores the terminal operating user identification data 54 corresponding to the first information processing terminal 3-1 associated with the friend data 60 corresponding to the user B.

In this example, under the condition that the account data generation section 74 of the information processing device 2 adds, to the account data 66 corresponding to the user A, the terminal operating user identification data 54 corresponding to a third information processing terminal 3-3, the information processing device 2 transmits, to the third information processing terminal 3-3, the friend data 60 corresponding to the user B. Then, the third information processing terminal 3-3 receives the friend data 60 and outputs the received friend data 60 to the data storage section 46 of the third information processing terminal 3-3.

As described above, in this modified example, the friend data is extracted to the information processing terminal 3 corresponding to the added terminal operating user identification data 54. Further, in this modified example, when communication is performed in the ad-hoc mode with respect to the second information processing terminal 3-2, the third information processing terminal 3-3 may treat the user B as the user associated with the user A.

Fifth Modified Example

Passing-By Communication

In a fifth modified example, before the processing denoted by S101 described above, the first information processing terminal 3-1 detects other information processing terminals 3 within a predetermined distance range from the first information processing terminal 3-1 at predetermined time intervals. Then, from the detected information processing terminal 3, the first information processing terminal 3-1 receives the terminal operating user identification data 54 of the detected information processing terminal 3. In this manner, under the condition that the user who operates the first information processing terminal 3-1 passes by, or gets on the same car of the train with, a user who operates another information processing terminal 3, for example, the first information processing terminal 3-1 receives the terminal operating user identification data 54 for identifying the user who operates this information processing terminal 3.

Sixth Modified Example

Processing Registering Friend with Account Data

In a sixth modified example, the data storage section 46 of the first information processing terminal 3-1 stores the terminal operating user identification data 54 associated with the account ID 68 of the user A, and the data storage section 46 of the second information processing terminal 3-2 stores the terminal operating user identification data 54 associated with the account ID 68 of the user B. Then, in this modified example, in the processing denoted by S101 and S102 described above, the terminal operating user identification data 54 of the user B associated with the account ID 68 of the user B is transmitted from the second information processing terminal 3-2 to the first information processing terminal 3-1. Then, in the processing denoted by S103 described above, the friend data registering section 50 of the first information processing terminal 3-1 generates the friend data 60 containing the account ID 68 of the user B and outputs the generated friend data 60 to the data storage section 46 of the first information processing terminal 3-1.

Then, in the processing denoted by S201 described above, the friend data transmitting section 52 of the first information processing terminal 3-1 transmits, to the information processing device 2, the account ID 68 of the user A in association with the account ID 68 of the user B. Then, in the processing denoted by S202 described above, the user association section 44 of the information processing device 2 outputs, to the data storage section 40 of the information processing device 2, the account ID 68 of the user A and the account ID 68 of the user B in association with each other.

As described above, in this modified example, when the account ID 68 of the user A is stored in the first information processing terminal 3-1 and the account ID 68 of the user B is stored in the second information processing terminal 3-2, association of the users (friend registration) may be performed by using the account ID 68.

Note that, the present invention is not limited to the above-mentioned modified examples. For example, the above-mentioned embodiment and modified examples may be combined.

Alternatively, in the processing denoted by S202 described above, for example, when the user association section 44 of the information processing device 2 outputs, to the data storage section 40 of the information processing device 2, the terminal operating user identification data 54 corresponding to the user A and the friend data 60 corresponding to the user B in association with each other, the terminal operating user identification data 54 corresponding to the user B and the friend data 60 corresponding to the user A may be associated with each other to be output to the data storage section 40 of the information processing device 2 also.

Alternatively, in the processing denoted by S202 described above, for example, the user association section 44 of the information processing device 2 may generate user association data containing the account ID 68 corresponding to the user A and the account ID 68 corresponding to the user B and output the generated user association data to the data storage section 40 of the information processing device 2.

Alternatively, under the condition that the first information processing terminal 3-1 receives the terminal operating user identification data 54 from the second information processing terminal 3-2 and outputs, to the data storage section 46 of the first information processing terminal 3-1, the friend data 60 on the user who operates the second information processing terminal 3-2, for example, the second information processing terminal 3-2 may receive the terminal operating user identification data 54 from the first information processing terminal 3-1 and output the friend data 60 on the user who operates the first information processing terminal 3-1 to the data storage section 46 of the second information processing terminal 3-2.

Figure 4:
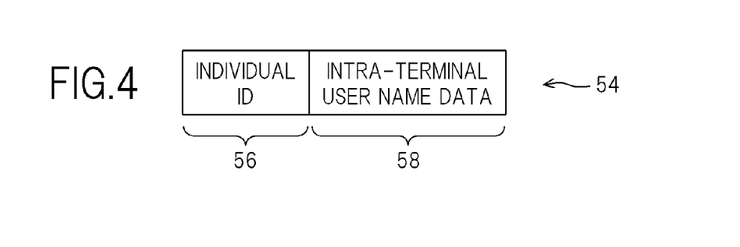
FIG. 4 is a diagram illustrating an example of a data structure of terminal operating user identification data.

Alternatively, the terminal operating user identification data 54 may contain attribute data indicating attributes of the user. Alternatively, the terminal operating user identification data 54 may contain, instead of the intra-terminal user name data 58, an identifier for uniquely identifying the user who operates the information processing terminal 3 in the terminal (for example, counter or the like). In this case, the terminal operating user identification data 54 may contain the intra-terminal user name data 58 as a part of the attribute data. Alternatively, under the condition that the user who may use the information processing terminal 3 is limited to one person, the terminal operating user identification data 54 may not contain the intra-terminal user name data 58. Alternatively, the account data 66 may contain data indicating the name of the user used in the network service, and a telephone number, e-mail address, credit card number, and the like of the user, for example.

The invention claimed is:

1. An information processing system, comprising:
an information processing device; and
an information processing terminal,
the information processing terminal comprising:
own terminal operating user identification data storage configured to store identification data which identifies a user who operates the information processing terminal;
other terminal operating user identification data receiving unit configured to receive identification data which identifies a user who operates another information processing terminal from the another information processing terminal via an ad hoc communication connection between the information processing terminal and the another information processing terminal without involving the information processing device in the ad hoc communication connection;
other terminal operating user identification data storage configured to store the identification data which identifies the user who operates the another information processing terminal; and
identification data transmitting unit configured to transmit, to the information processing device, the identification data which identifies the user who operates the information processing terminal and the identification data which identifies the user who operates the another information processing terminal in association with each other,
the information processing device comprising:
identification data receiving unit configured to receive the identification data which identifies the user who operates the information processing terminal and the identification data which identifies the user who operates the another information processing terminal, transmitted by the identification data transmitting unit; and
user association unit configured to associate the user who operates the information processing terminal and the user who operates the another information processing terminal based on the identification data which identifies the user who operates the information processing terminal and the identification data which identifies the user who operates the another information processing terminal received by the identification data receiving unit and based on a previous exchange of data between the information processing terminal and the another information processing terminal while the users of said terminals were playing a game together over the ad hoc communication network.

2. The information processing system according to claim 1, wherein the other terminal operating user identification data storage stores a plurality of identification data, each identification data corresponds to one of a plurality of other information processing terminals, and identifies a user who operates the corresponding other information processing terminal,
wherein the identification data transmitting unit transmits, to the information processing device, the plurality of identification data, each identification data identifies the user who operates the corresponding other information processing terminal and the identification data which identifies the user who operates the information processing terminal in association with each other, and
wherein the user association unit associates the user who operates the information processing terminal and the users, each user operates the corresponding other information processing terminals, wherein the association is based on previous exchange of data between the information processing terminal and the other information processing terminal while users of said terminals were playing a game together.

3. The information processing system according to claim 1, wherein the information processing device further comprises account data generation unit configured to generate, upon request of a user, account data of the user associated with an information processing terminal operated by the user, and the user association unit associates account data of the user who operates the information processing terminal with account data of the user who operates the another information processing terminal.

4. The information processing system according to claim 3, wherein under a condition that the account data generation unit generates the account data, the user association unit associates the account data with another piece of account data.

5. The information processing system according to claim 3, wherein the account data is associated with a plurality of information processing terminals, and
wherein the user association unit associates each information processing terminal associated with account data corresponding to the user who operates the information processing terminal and each information processing terminal associated with the account data corresponding to the user who operates the another information processing terminal.

6. The information processing system according to claim 5, wherein the information processing device further comprises:
information processing terminal association unit configured to associate the account data with a new information processing terminal; and
transmitting unit configured to transmit, under a condition that the new information processing terminal is associated, the identification data which identifies the user who operates the another information processing terminal to the new information processing terminal.

7. The information processing system according to claim 3, wherein the own terminal operating user identification data storage stores the identification data which identifies the user who operates the information processing terminal with an identifier of the account data of the user,
wherein the other terminal operating user identification data receiving unit receives the identification data which identifies the user who operates the another information processing terminal associated with an identifier of the account data of the user who operates the another information processing terminal,
wherein the other terminal operating user identification data storage stores the identifier of the account data of the user who operates the another information processing terminal in association with the identification data which identifies the user who operates the another information processing terminal,
wherein under a condition that the identifier of the account data of the user who operates the information processing terminal is stored in the own terminal operating user identification data storage and the identifier of the account data of the user who operates the another information processing terminal is stored in the other terminal operating user identification data storage, instead of transmitting the identification data, the identification data transmitting unit transmits, to the information processing device, the identifier of the account data of the user who operates the information processing terminal and the identifier of the account data of the user who operates the another information processing terminal in association with each other,
wherein the identification data receiving unit receives the identifiers of the account data transmitted by the identification data transmitting unit, and
the user association unit associates, based on the identifiers of the account data received by the identification data receiving unit, the account data of the user who operates the information processing terminal and the account data of the user who operates the another information processing terminal.

8. The information processing system according to claim 1, wherein the identification data contains an identifier unique to an information processing terminal corresponding to the identification data.

9. An information processing method, comprising:
storing, by an information processing terminal, identification data which identifies a user who operates the information processing terminal in own terminal operating user identification data storage unit;
receiving, by the information processing terminal, identification data which identifies a user who operates another information processing terminal from the another information processing terminal via an ad hoc communication connection between the information processing terminal and the another information processing terminal without involving an information processing device in the ad hoc communication connection;
storing, by the information processing terminal, the identification data which identifies the user who operates the another information processing terminal in other terminal operating user identification data storage unit;
transmitting, by the information processing terminal, to the information processing device, the identification data which identifies the user who operates the information processing terminal and the identification data which identifies the user who operates the another information processing terminal in association with each other;
receiving, by the information processing device, the transmitted identification data which identifies the user who operates the information processing terminal and the identification data which identifies the user who operates the another information processing terminal; and
associating, by the information processing device, based on the received identification data which identifies the user who operates the information processing terminal and the identification data which identifies the user who operates the another information processing terminal and based on previous exchange of data between the information processing terminal and the another information processing terminal while users of said terminals were playing a game together over the ad hoc communication network, the user who operates the information processing terminal and the user who operates the another information processing terminal.

10. An information processing device capable of communicating with respect to an information processing terminal, wherein the information processing terminal includes: (i) own terminal operating user identification data storage configured to store identification data which identifies a user who operates the information processing terminal; (ii) other terminal operating user identification data receiving unit configured to receive identification data which identifies a user who operates another information processing terminal from the another information processing terminal via an ad hoc communication connection between the information processing terminal and the another information processing terminal without involving the information processing device in the ad hoc communication connection; (iii) other terminal operating user identification data storage configured to store the identification data which identifies the user who operates the another information processing terminal; and (iv) identification data transmitting unit configured to transmit the identification data which identifies the user who operates the another information processing terminal and the identification data which identifies the user who operates the information processing terminal in association with each other, the information processing device comprising:
identification data receiving unit configured to receive the identification data which identifies the user who operates the information processing terminal and the identification data which identifies the user who operates the another information processing terminal, transmitted from the identification data transmitting unit; and
user association unit configured to associate, based on the identification data which identifies the user who operates the information processing terminal and the identification data which identifies the user who operates the another information processing terminal received by the identification data receiving unit and based on previous exchange of data between the information processing terminal and the another information processing terminal while users of said terminals were playing a game together over the ad hoc communication network, the user who operates the information processing terminal with respect to which the information processing device is capable of communicating and the user who operates the another information processing terminal.

11. A control method for an information processing device capable of communicating with respect to an information processing terminal, the control method comprising:
receiving identification data which identifies a user who operates the information processing terminal and identification data which identifies a user who operates another information processing terminal; and
associating, based on the received identification data which identifies the user who operates the information processing terminal and the identification data which identifies the user who operates the another information processing terminal and based on previous exchange of data between the information processing terminal and the another information processing terminal while users of said terminals were playing a game together over an ad hoc communication connection between the information processing terminal and the another information processing terminal without involving the information processing device in the ad hoc communication connection, the user who operates the information processing terminal with respect to which the information processing device is capable of communicating and the user who operates the another information processing terminal.

12. A non-transitory computer readable medium having stored thereon a program for causing a computer to function as an information processing device capable of communicating with respect to an information processing terminal, the program including instructions which when executed by a processor cause the information processing device to:
receive transmitted identification data which identifies a user who operates an information processing terminal and identification data which identifies a user who operates the another information processing terminal; and
associate, based on the identification data which identifies the user who operates the information processing terminal and the identification data which identifies the user who operates the another information processing terminal and based on previous exchange of data between the information processing terminal and the another information processing terminal while users of said terminals were playing a game together over an ad hoc communication connection between the information processing terminal and the another information processing terminal without involving the information processing device in the ad hoc communication connection, the user who operates the information processing terminal with respect to which the information processing device is capable of communicating and the user who operates the another information processing terminal.

13. An information processing terminal capable of communicating with respect to an information processing device, comprising:
   own terminal operating user identification data storage configured to store identification data which identifies a user who operates the information processing terminal;
   other terminal operating user identification data receiving unit configured to receive identification data which identifies a user who operates another information processing terminal from the another information processing terminal via an ad hoc communication connection between the information processing terminal and the another information processing terminal without involving the information processing device in the ad hoc communication connection;
   other terminal operating user identification data storage configured to store the identification data which identifies the user who operates the another information processing terminal; and
   identification data transmitting unit configured to transmit, to the information processing device, the identification data which identifies the user who operates the information processing terminal and the identification data which identifies the user who operates the another information processing terminal in association with each other, the information processing device associating the user who operates the information processing terminal and the user who operates the another information processing terminal with each other based on the identification data which identifies the user who operates the information processing terminal and the identification data which identifies the user who operates the another information processing terminal and based on previous exchange of data between the information processing terminal and the another information processing terminal while users of said terminals were playing a game together over the ad hoc communication network.

14. A control method for an information processing terminal capable of communicating with respect to an information processing device, the control method comprising:
   storing identification data which identifies a user who operates the information processing terminal in own terminal operating user identification data storage unit;
   receiving identification data which identifies a user who operates another information processing terminal from the another information processing terminal via an ad hoc communication connection between the information processing terminal and the another information processing terminal without involving the information processing device in the ad hoc communication connection;
   storing the identification data which identifies the user who operates the another information processing terminal in other terminal operating user identification data storage unit; and
   transmitting, to the information processing device, the identification data which identifies the user who operates the information processing terminal and the identification data which identifies the user who operates the another information processing terminal in association with each other, the information processing device associating the user who operates the information processing terminal and the user who operates the another information processing terminal with each other based on the identification data which identifies the user who operates the information processing terminal and the identification data which identifies the user who operates the another information processing terminal and based on previous exchange of data between the information processing terminal and the another information processing terminal while users of said terminals were playing a game together over the ad hoc communication network.

15. A non-transitory computer readable medium having stored thereon a program which when executed by a processor of a computer causes the computer to function as an information processing terminal capable of communicating with respect to an information processing device, the program including instructions to:
   store identification data which identifies a user who operates the information processing terminal in own terminal operating user identification data storage unit;
   receive identification data which identifies a user who operates another information processing terminal from the another information processing terminal via an ad hoc communication connection between the information processing terminal and the another information processing terminal without involving the information processing device in the ad hoc communication connection;
   store the identification data which identifies the user who operates the another information processing terminal in other terminal operating user identification data storage unit; and
   transmit, to the information processing device, the identification data which identifies the user who operates the information processing terminal and the identification data which identifies the user who operates the another information processing terminal in association with each other, the information processing device associating the user who operates the information processing terminal and the user who operates the another information processing terminal with each other based on the identification data which identifies the user who operates the information processing terminal and the identification data which identifies the user who operates the another information processing terminal and based on previous exchange of data between the information processing terminal and the another information processing terminal while users of said terminals were playing a game together over the ad hoc communication network.

16. An apparatus including a processor and a memory containing a computer program, the processor executing the computer program such that the apparatus functions as an information processing terminal capable of communicating with respect to an information processing device, the program including instructions to cause the processor to:
   store identification data which identifies a user who operates the information processing terminal in own terminal operating user identification data storage unit;
   receive identification data which identifies a user who operates another information processing terminal from the another information processing terminal via an ad hoc communication connection between the information processing terminal and the another information processing terminal without involving the information processing device in the ad hoc communication connection;

store the identification data which identifies the user who operates the another information processing terminal in other terminal operating user identification data storage unit; and transmit, to the information processing device, the identification data which identifies the user who operates the information processing terminal and the identification data which identifies the user who operates the another information processing terminal in association with each other, the information processing device associating the user who operates the information processing terminal and the user who operates the another information processing terminal with each other based on the identification data which identifies the user who operates the information processing terminal and the identification data which identifies the user who operates the another information processing terminal and based on previous exchange of data between the information processing terminal and the another information processing terminal while users of said terminals were playing a game together over the ad hoc communication network.

17. An information processing system, comprising:
an information processing device; and
an information processing terminal,
the information processing terminal comprising:
own terminal operating user identification data storage configured to store identification data which identifies a user who operates the information processing terminal;
other terminal operating user identification data receiving unit configured to receive identification data which identifies a user who operates another information processing terminal from the another information processing terminal;
other terminal operating user identification data storage configured to store the identification data which identifies the user who operates the another information processing terminal; and
identification data transmitting unit configured to transmit, to the information processing device, the identification data which identifies the user who operates the information processing terminal and the identification data which identifies the user who operates the another information processing terminal in association with each other,
the information processing device comprising:
identification data receiving unit configured to receive the identification data transmitted by the identification data transmitting unit;
user association unit configured to associate, based on the identification data received by the identification data receiving unit, the user who operates the information processing terminal and the user who operates the another information processing terminal; and
account data generation unit configured to generate, upon request of a user, account data of the user associated with an information processing terminal operated by the user,
wherein the user association unit associates account data of the user who operates the information processing terminal with account data of the user who operates the another information processing terminal,
wherein the own terminal operating user identification data storage stores the identification data which identifies the user who operates the information processing terminal with an identifier of the account data of the user,
wherein the other terminal operating user identification data receiving unit receives the identification data which identifies the user who operates the another information processing terminal associated with an identifier of the account data of the user who operates the another information processing terminal,
wherein the other terminal operating user identification data storage stores the identifier of the account data of the user who operates the another information processing terminal in association with the identification data which identifies the user who operates the another information processing terminal,
wherein under a condition that the identifier of the account data of the user who operates the information processing terminal is stored in the own terminal operating user identification data storage and the identifier of the account data of the user who operates the another information processing terminal is stored in the other terminal operating user identification data storage, instead of transmitting the identification data, the identification data transmitting unit transmits, to the information processing device, the identifier of the account data of the user who operates the information processing terminal and the identifier of the account data of the user who operates the another information processing terminal in association with each other, and
wherein the identification data receiving unit receives the identifiers of the account data transmitted by the identification data transmitting unit, and the user association unit associates, based on the identifiers of the account data received by the identification data receiving unit, the account data of the user who operates the information processing terminal and the account data of the user who operates the another information processing terminal.

* * * * *